US007509583B2

(12) United States Patent
Yoda et al.

(10) Patent No.: US 7,509,583 B2

(45) Date of Patent: Mar. 24, 2009

(54) IMAGE PROCESSING SYSTEM

(75) Inventors: Nobuhisa Yoda, Kamakura (JP); Kazuaki Kidokoro, Yokohama (JP); Tatsuya Haraguchi, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 977 days.

(21) Appl. No.: 11/032,005

(22) Filed: Jan. 11, 2005

(65) Prior Publication Data

US 2005/0177793 A1 Aug. 11, 2005

Related U.S. Application Data

(63) Continuation of application No. 09/589,356, filed on Jun. 8, 2000, now Pat. No. 6,943,812.

(30) Foreign Application Priority Data

Jun. 10, 1999 (JP) ................................ 11-164026

(51) Int. Cl.
*G06F 3/00* (2006.01)

(52) U.S. Cl. ...................................................... 715/741

(58) Field of Classification Search .................. 715/741
See application file for complete search history.

(56) References Cited

U.S. PATENT DOCUMENTS

| | | | | |
|---|---|---|---|---|
| 5,394,521 | A | 2/1995 | Henderson, Jr. et al. | |
| 5,673,401 | A | 9/1997 | Volk et al. | |
| 5,880,727 | A | 3/1999 | Barrett et al. | |
| 5,892,828 | A * | 4/1999 | Perlman | 713/183 |
| 6,069,706 | A | 5/2000 | Kajita et al. | |
| 6,115,040 | A | 9/2000 | Bladow et al. | |
| 6,417,870 | B1 | 7/2002 | Brackett et al. | |
| 6,539,482 | B1 * | 3/2003 | Blanco et al. | 726/7 |
| 6,778,288 | B1 | 8/2004 | Ogaki et al. | |

FOREIGN PATENT DOCUMENTS

JP 9-205513 A 8/1997

* cited by examiner

*Primary Examiner*—Stephen S Hong
*Assistant Examiner*—Le Nguyen
(74) *Attorney, Agent, or Firm*—Foley & Lardner LLP

(57) ABSTRACT

The hierarchy of an operation screen of a digital PPC (scanner device) used as an image fetching device is set to correspond to the hierarchy of a directory in a file server for recording a scanned image file. That is, the hierarchy of the operation screen and the hierarchy of the directory are set to have a correspondence relation with respect to each other and changing points of the respective hierarchies reflect on the opposite hierarchies.

5 Claims, 15 Drawing Sheets

41 42 43 44

| SCREEN ID | SCREEN NAME | CREATOR | PASSWORD NUMBER |
|---|---|---|---|
| 1 | FOR BUSINESS DEPARTMENT IMAGE FETCHING | TAKAHASHI | 1234 |
| 2 | FOR SCRAP STORAGE | YOSHIDA | 9474 |
| 3 | FOR DEVELOPMENT GROUP | MIKI | 8147 |
| : | : | : | : |

~40

41 42 43 44

| SCREEN ID | SCREEN NAME | CREATOR | PASSWORD NUMBER |
|---|---|---|---|
| 1 | FOR BUSINESS DEPARTMENT IMAGE FETCHING | TAKAHASHI | 1234 |
| 2 | FOR SCRAP STORAGE | YOSHIDA | 9474 |
| 3 | FOR DEVELOPMENT GROUP | MIKI | 8147 |
| : | : | : | : |

40

50

| 51 BUTTON ID | 52 ALLOTMENT DESTINATION SCREEN ID | 53 BUTTON NAME | 54 CREATOR | 55 PROCESSING CONTENTS | 56 PROCESS PARAMETER | 57 FETCH PARAMETER | 58 PASSWORD NUMBER |
|---|---|---|---|---|---|---|---|
| 1 | 1 | CATALOGUE FETCHING | TAKAHASHI | STORAGE INTO FILE SERVER | Bitmap FORM | 300dpi | 5678 |
| 2 | 1 | NOTICE-OF-VACATION FETCHING | YOSHIDA | STORAGE INTO FILE SERVER | Bitmap FORM | 300dpi | 4353 |
| 3 | 1 | BUSINESS CONFERENCE PROCEEDINGS FETCHING | YOSHIDA | STORAGE INTO FILE SERVER | Bitmap FORM | 300dpi | 6435 |
| 4 | 2 | NEW PRODUCT CATALOGUE FETCHING | MIKI | STORAGE INTO FILE SERVER | Bitmap FORM | 300dpi | 6522 |
| .. | .. | .. | .. | .. | .. | .. | .. |

FIG. 5

SCREEN ID 10 64
SCREEN NAME BUSINESS DEPARTMENT IMAGE FETCHING 65
CREATOR TAKAHASHI 66
PASSWORD NUMBER * * * * 67
68 SET
CANCEL 69

BUTTON ID 8 70
ALLOTMENT DESTINATION SCREEN ID 10 71
BUTTON NAME CATALOGUE FETCH 72
CREATOR TAKAHASHI 73
PROCESS CONTENTS STORAGE INTO FILE SERVER 74
PROCESS PARAMETER NO PARAMETER 75
FETCH PARAMETER 300dpi, Bitmap FORM 76
PASSWORD NUMBER * * * * 77
78 SET
CANCEL 79

```
H:¥>dir
    NO VOLUME LABEL OF DRIVE H
    VOLUME SERIAL NUMBER IS 80EA-369F
    H:DIRECTORY OF ¥
  99/06/02  11:47   <DIR>
  99/06/02  11:47   <DIR>
  99/06/02  12:01   <DIR>  SCRAP STORAGE
  99/06/02  12:01   <DIR>  BUSINESS DEPARTMENT IMAGE FETLHING
  99/06/02  11:47   <DIR>  DEVELOPMENT GROUP
             FIVE FILES      0 BYTE
                    SPACE AREA OF 701,034,496 BYTES
H:¥>dir FOR BUSINESS DEPARTMENT IMAGE FETCHING
    NO VOLUME LABEL OF DRIVE H
    VOLUME SERIAL NUMBER IS 80EA-369F
    H:¥BUSINESS DEPARTMENT IMAGE FETCHING DIRECTORY
 NO FILE IS FOUND
H:¥>dir FOR BUSINESS DEPARTMENT IMAGE FETCHING ¥1234
    NO VOLUME LABEL OF DRIVE H
    VOLUME SERIAL NUMBER IS 80EA-369F
    H:¥ DIRECTORY FORBUSINESS DEPARTMENT IMAGE FETCHING ¥1234
  99/06/02  11:48   <DIR>
  99/06/02  11:48   <DIR>
  99/06/02  11:48   <DIR>  CATALOGUE FETCHING
  99/06/02  11:48   <DIR>  NOTICE-OF-VACATION FETCHING
  99/06/02  11:48   <DIR>  BUSINESS CONFERENCE
                           PROCEEDINGS FETCHING
  99/06/02  11:49   <DIR>  NEW PRODUCT CATALOGUE FETCHING
             SIX FILES       0 BYTE
                    SPACE AREA OF 701,034,496 BYTES
H:¥>
```

FIG. 15

| SCREEN ID (41) | SCREEN NAME (42) | CREATOR (43) | UTILIZATION USER (44) |
|---|---|---|---|
| 1 | FOR BUSINESS DEPARTMENT IMAGE FET CHING | TAKAHASHI | TAKAHASHI, YOSHIDA, MIKI |
| 2 | FOR SCRAP STORAGE | YOSHIDA | YOSHIDA, HASHIMOTO |
| 3 | FOR DEVELOPMENT GROUP | MIKI | TAKAGI, KAMIYAMA |
| : | : | : | : |

| BUTTON ID (51) | ALLOTMENT DESTINATION SCREEN ID (52) | BUTTON NAME (53) | CREATOR (54) | PROCESSING CONTENTS (55) | PROCESS PARAMETER (56) | FETCH PARAMETER (57) | UTILIZATION USER (59) |
|---|---|---|---|---|---|---|---|
| 1 | 1 | CATALOGUE FETCHING | TAKAHASHI | STORAGE INTO FILE SERVER | Bitmap FORM | 300dpi | TAKAHASHI |
| 2 | 1 | NOTICE-OF-VACATION FETCHING | YOSHIDA | STORAGE INTO FILE SERVER | Bitmap FORM | 300dpi | YOSHIDA, MIKI |
| 3 | 1 | BUSINESS CONFERENCE PROCEEDINGS FETCHING | YOSHIDA | STORAGE INTO FILE SERVER | Bitmap FORM | 300dpi | TAKAHASHI |
| 4 | 2 | NEW PRODUCT CATALOGUE FETCHING | MIKI | STORAGE INTO FILE SERVER | Bitmap FORM | 300dpi | HASHIMOTO |
| : | : | : | : | : | : | : | : |

FIG. 17

| BUTTON ID | 8 | 101 |
|---|---|---|
| ALLOTMENT DESTINATION SCREEN ID | 10 | 102 |
| BUTTON NAME | CATALOGUE FETCH | 103 |
| CREATOR | TAKAHASHI | 104 |
| PROCESS CONTENTS | STORAGE INTO FILE SERVER | 105 |
| PROCESS PARAMETER | NO PARAMETER | 106 |
| FETCH PARAMETER | 300dpi, Bitmap FORM | 107 |
| UTILIZATION USER | TAKAHASHI | 108 |

109 SET CANCEL 110

FIG. 19

USER NAME

TAKAHASHI 111

PASSWORD

* * * * 112

113 OK CANCEL 114

FIG. 20

```
H:¥>dir
    NO VOLUME LABEL OF DRIVE H
    VOLUME SERIAL NUMBER IS 80EA-369F
    H:DIRECTORY OF ¥
  99/06/02  11:47   <DIR>
  99/06/02  11:47   <DIR>
  99/06/02  12:49   <DIR>   SCRAP STORAGE
  99/06/02  12:50   <DIR>   BUSINESS DEPARTMENT IMAGE
                            FETLHING
  99/06/02  12:50   <DIR>   DEVELOPMENT GROUP
            FIVE FILES      0 BYTE
                  SPACE AREA OF 701,034,496 BYTES
H:¥>dir FOR BUSINESS DEPARTMENT IMAGE FETDHING
    NO VOLUME LABEL OF DRIVE H
    VOLUME SERIAL NUMBER IS 80EA-369F
    H:¥ BUSINESS DEPARTMENT IMAGE FETCHING DIRECTORY
 NO FILE IS FOUND

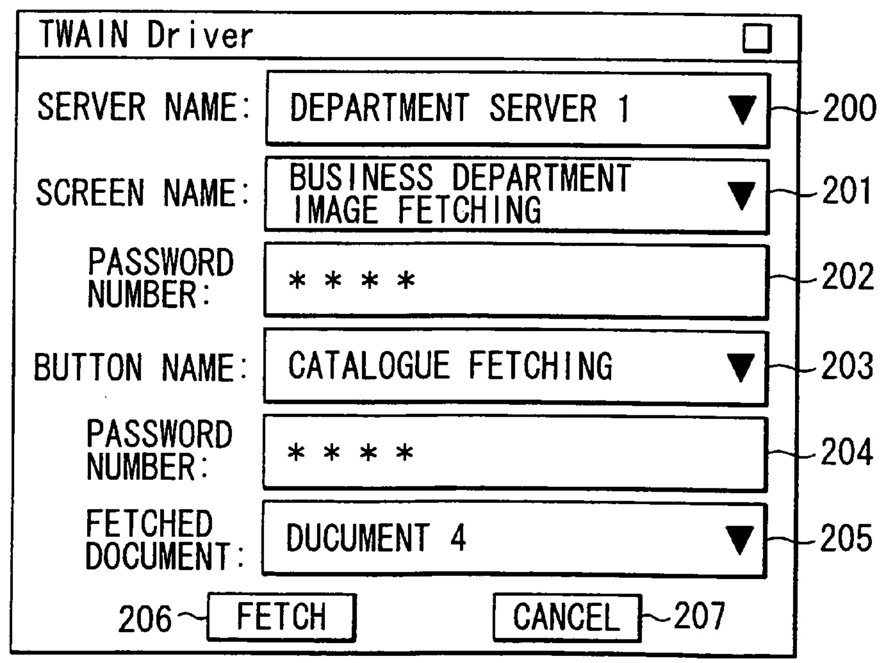

FIG. 23

IMAGE PROCESSING SYSTEM

CROSS-REFERENCE TO RELATED APPLICATIONS

The present application is a continuation of U.S. application Ser. No. 09/589,356, filed Jun. 8, 2000, now U.S. Pat. No. 6,943,812 which claims priority of Japanese Patent Application No. 11-164026, filed Jun. 10, 1999, the entire contents of both applications are incorporated herein by reference.

BACKGROUND OF THE INVENTION

This invention relates to an image processing system commonly used by a plurality of personal computers by using a digital copying machine as a scanner device in a local area network on which the personal computers and digital copying machine are connected via a file server, for example.

In recent years, paper documents still play an important role in offices in which the service using documents formed in an electronic data form is generalized with the development of large-capacity memory devices and network and the necessity of efficiently taking information recorded on paper into the electronic data-form environment is increased according to the user environment dealing with electronic data-form information.

In an application field of the conventional scanner device, the scanner device is installed and exclusively used for a specified user or machine and deals with an independent document each time an image of the document is required to be read. Thus, the necessity for reading or fetching the image is generalized, requests for reading a large number of documents by a plurality of users are increased and an idea of commonly using a scanner device with high speed and highly intelligent function by a plurality of users is widely spread to make the image reading operation efficient.

Under this condition, in order to reduce occupied time of the scanner device commonly used, an attempt is made to previously allot an image reading function to the operation button of the scanner device and omit the setting operation for the scanner device which will be effected by the user at the time of image reading, or provide a common file server for temporarily storing a read image and set a directory of storage destination of the previously fetched image on the file server to the operation button of the scanner device so that the process for confirming or modifying the read or fetched image can be effected in a place separated from the scanner device.

A plurality of operation buttons are prepared in the scanner device or digital copying machine according to a condition in which the scanner is commonly used by a plurality of users and the improvement is made according to the common-usage environment in which the individual user can allot the function used by himself to the operation button.

For the common scanner, it is an important subject to acquire the security for a read or fetched image, and in the conventional case (Jpn. Pat. Appln. KOKAI Publication No. 9-205513), users who can utilize buttons for the respective operation buttons and authorities for access to the fetched image are previously set to the operation buttons by separately providing a server for effecting the user management.

By setting the various contents to the operation buttons of the scanner device, the degree of freedom of the user setting is greatly increased, but the processing contents for the operation buttons and the setting operation of the access authority become complicated because of the high degree of freedom and there occurs a problem that the simplicity of utilization of the scanner device is lost.

BRIEF SUMMARY OF THE INVENTION

An object of this invention is to permit a recording image on the file server to be easily confirmed from a client terminal and improve the operability by setting the hierarchy of an operation screen of the image reading device to correspond to the hierarchy of the directory of the file server for recording the read image file.

Further, an object of this invention is to make it possible to effect easy access control with respect to an image recorded on the file server.

In order to attain the above object, according to one aspect of this invention, there is provided an image processing system comprising an image reading device for reading an image; a file server for recording the image from the image reading device; and a plurality of client terminals connected to the file server via a communication line, for commonly using the image reading device; wherein the operation hierarchy of an operation screen of the image reading device is set to have a correspondence relation with respect to the directory hierarchy for recording the image of the file server and changing points of the respective hierarchies reflect on the opposite hierarchies.

According to another aspect of this invention, there is provided an image processing system comprising an image reading device for reading an image; a file server for recording the image from the image reading device; and a plurality of client terminals connected to the file server via a communication line, for commonly using the image reading device; wherein the operation hierarchy of an operation screen of the image reading device is set to have a correspondence relation with respect to the directory hierarchy for recording the image of the file server, changing points of the hierarchies reflect on the opposite hierarchies, an access limit of each user is allotted to the operation screen of a preset operation hierarchy of the image reading device or a button displayed on the operation screen and the access limit is also commonly allotted to the directory hierarchy of the file server for recording the image which corresponds to the preset operation hierarchy of the image reading device.

According to still another aspect of this invention, there is provided an image processing system comprising an image reading device for reading an image; a file server for recording the image from the image reading device; and a plurality of client terminals connected to the file server via a communication line, for commonly using the image reading device; wherein the operation hierarchy of an operation screen of the image reading device is set to have a correspondence relation with respect to the directory hierarchy for recording the image of the file server, changing points of the respective hierarchies reflect on the opposite hierarchies, a password number is set on the operation screen of a preset operation hierarchy of the image reading device or a button displayed on the operation screen and a secret directory having a name based on the password number is automatically formed on the directory hierarchy of the file server corresponding to the preset operation hierarchy of the image reading device.

According to another aspect of this invention, there is provided an image processing system comprising an image reading device for reading an image; a file server for recording the image from the image reading device; and a plurality of client terminals connected to the file server via a communication line, for commonly using the image reading device;

wherein the image reading device includes reading means for reading an image, and a control panel for displaying a screen on which a button for instructing the reading operation of the reading means is displayed and setting the reading operation, and the file server includes recording means for recording an image read by the reading means of the image reading device in a directory of the hierarchical structure, and the hierarchical structure of the screen displayed on the control panel of the image reading device and the hierarchical structure of the directory of the recording means of the file server are commonly allotted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a diagram showing an example of an operation button setting table;

FIG. 15 is a view showing an example of display in a case where access is made to the directory of the structure shown in FIG. 14;

FIG. 16 is a diagram showing an example of an image setting table;

FIG. 17 is a diagram showing an example of an operation button setting table;

FIGS. 19 and 20 are views showing examples of display of an image display device;

FIG. 22 is a view showing an example of display in a case where access is made to the directory of the structure shown in FIG. 21; and FIG. 23 is a view showing an example of a user screen in a case where access is made to the file server by use of a scanner fetching application and a device driver for access mediation.

DETAILED DESCRIPTION OF THE INVENTION

There will now be described an image processing system according to embodiments of this invention with reference to the accompanying drawings.

Figure 1:
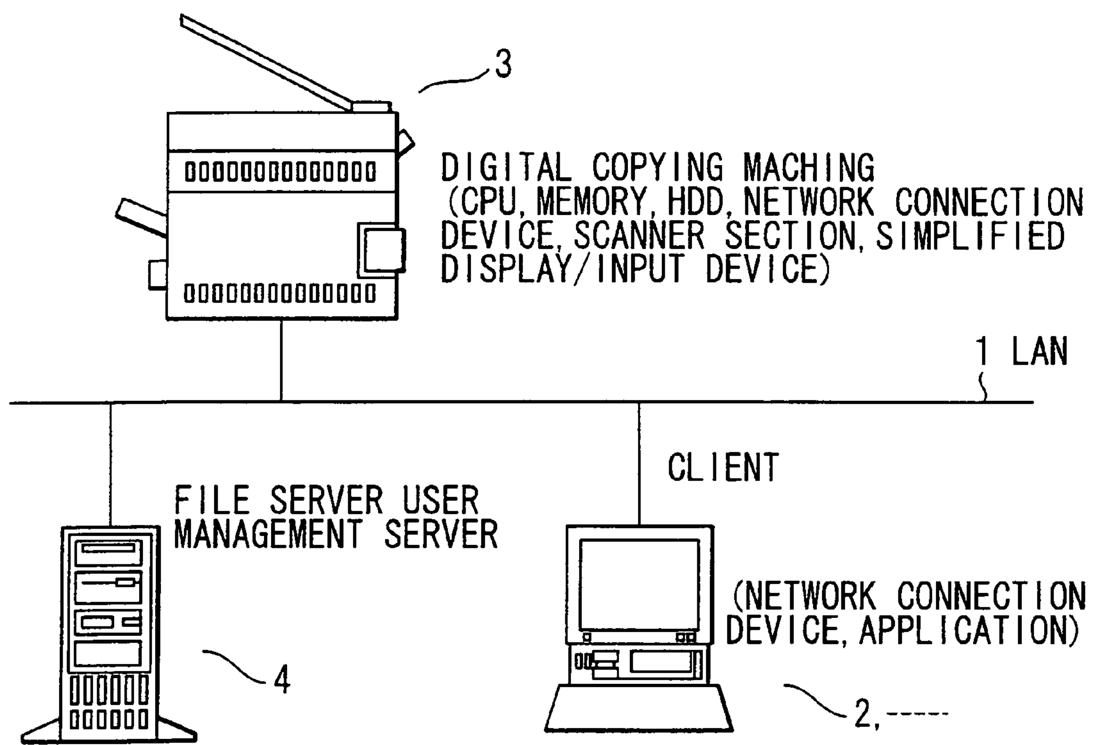
FIG. 1 is a view showing the schematic construction of an image processing system according to one embodiment of this invention.
Figure 2:
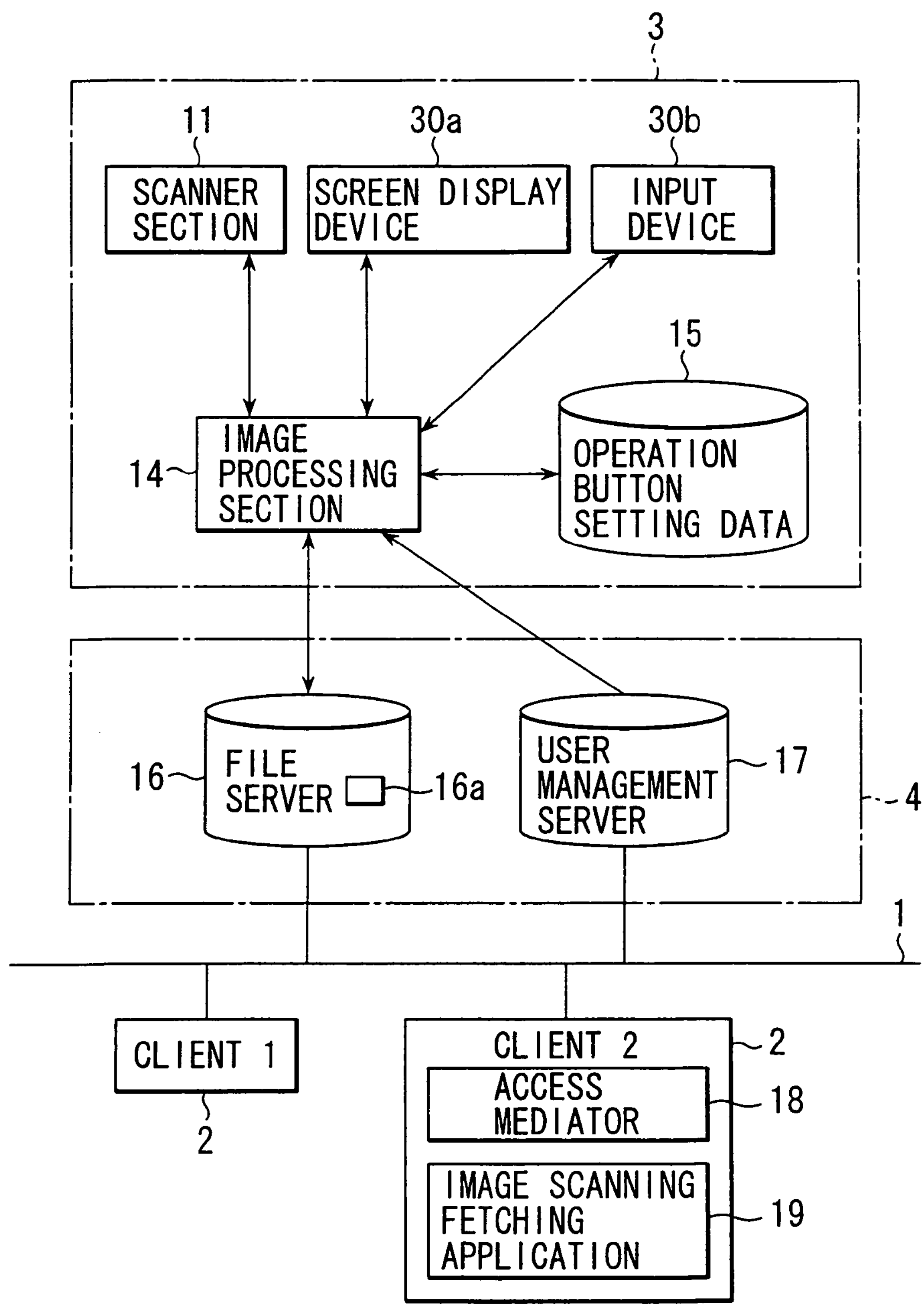
FIG. 2 is a block diagram showing the schematic construction of the image processing system.

FIGS. 1 and 2 show the schematic construction of an image processing system of this invention.

That is, as shown in FIGS. 1 and 2, the image processing system includes a plurality of personal computers (PC: image output device, client) 2, a digital copying machine 3 having a scanner function (image reading device) and a file server section (file server, user management server) 4 which are connected to a local network (LAN) 1.

The PC 2, . . . receive and utilize an image of an original read by the scanner function of the digital copying machine 3 and the scanner function of the digital copying machine 3 is commonly utilized by the PC 2, . . . .

Each of the PC 2, . . . has a keyboard, display section, LAN board and the like which are not shown in the drawing.

The user accesses the file server section 4 via the network 1 by use of the PC 2 as a client. The file server section 4 includes a file server 16 and user management server 17.

Figures 3, 4:
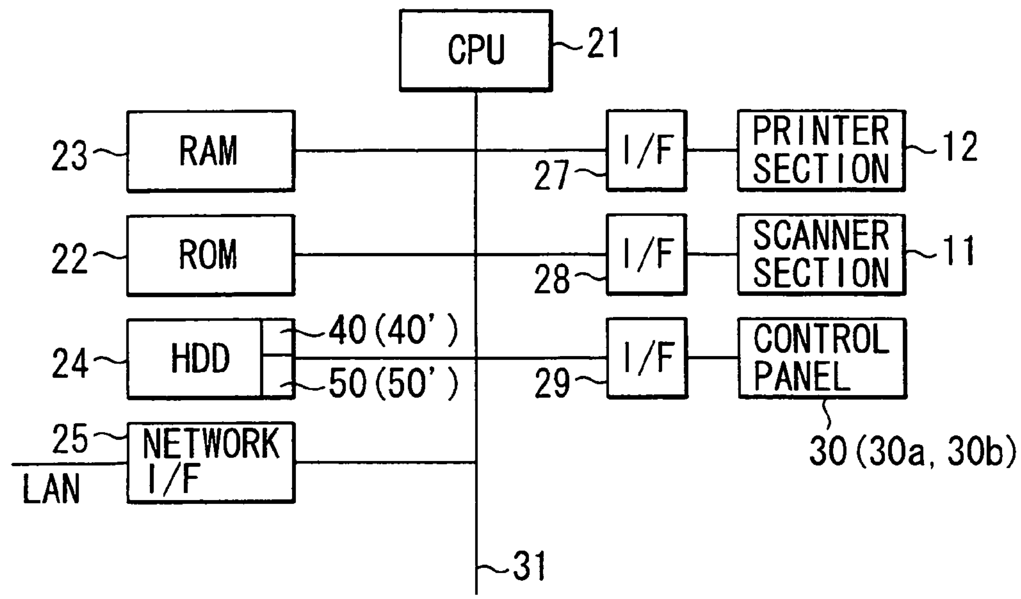
FIG. 3 is a block diagram showing the schematic construction of a digital copying machine.
FIG. 4 is a diagram showing an example of an image setting table.

The schematic construction of the digital copying machine 3 is shown in FIG. 3. When the digital copying machine 3 is used as a general copying machine, an image signal read by a scanner section 11 is supplied to a printer section 12 and then printed. For this purpose, the scanner section 11 is formed as a scanner hardware for converting paper documents to an electronic image and has a CCD for converting light obtained by scanning the original to an electrical signal.

In this embodiment, the printer section 12 is a device for printing by use of an electrophotographic system. Therefore, if the printer section 12 receives an electrical signal of the image, it prints the image on a sheet of paper (image forming medium). As the printer section 12, an ink jet printer can be used instead of the electrophotographic printer.

The whole portion of the digital copying machine 3 is schematically explained below.

The digital copying machine 3 includes a CPU 21 for controlling the operation thereof, a ROM 22 storing a software of the operation of the digital copying machine 3, a RAM 23 for temporarily storing image data and other data related to the operation, a hard disk device (HDD) 24 for storing image data and other various types of data items, a network interface 25 for transferring signals with respect to the LAN 1, an interface 27 for controlling transfer of signals between the printer section 12 and other portions, the printer section 12 connected to the interface 27, an interface 28 for controlling transfer of signals between the scanner section 11 and other portions, the scanner section 11 connected to the interface 28, a control panel 30 for displaying an instruction of the operation of the digital copying machine 3 and accepts an operation of the operator, and an interface 29 for the control panel 30 for transferring signals between the control panel 30 and other portions.

The CPU 21, ROM 22, RAM 23, HDD 24, network interface 25, interface 27 for the printer section 12, interface 28 for the scanner section 11, interface 29 for the control panel 30 are connected to one another via a bus 31 and data is transferred therebetween. A necessary signal is transferred between the units via the bus 31.

The control panel 30 includes a screen display device (liquid crystal display device) 30*a* containing a touch panel for displaying and inputting set contents and operation contents and an input device 30*b* formed of a simple keyboard including a ten-key pad and alphabet keys.

The image processing section 14 of FIG. 2 is constructed by the CPU 21, ROM 22, RAM 23, HDD 24.

The image processing section 14 controls the scanner section 11, screen display device 30*a*, input device 30*b*, displays the contents recorded on the operation button setting data 15 contained in the HDD 24 on the screen display device 30*a*, and fetches an image from the scanner section 11 based on the contents input by the user. For example, the contents recorded on the operation button setting data 15 are obtained as shown in a screen setting table 40 and operation button setting table 50 shown in FIGS. 4 and 5.

In this example, in order to display a large number of operation buttons on the screen display device 30*a* of the control panel 30 which generally has only a limited display area, the operation buttons can be classified by use of a "screen" indicating a set of operation buttons.

FIG. 4 shows the screen setting table 40 for recording information relating to the "screen". A plurality of "screens" are set by use of a screen ID 41 and an screen name 42 and creator 43 are allotted as information for identifying the screen.

Further, a password number 44 can be set for each screen in order to prevent the "screen" set for special application purpose from being erroneously used by a different user.

FIG. 5 shows an example of the operation button setting table 50 for recording information relating to the operation button for starting the image fetching operation.

A plurality of operation buttons are distinguished from one another by use of a button ID 51. An allotment destination screen ID 52 is information indicating whether or not the operation button is classified in the "screen". In order to easily classify the operation buttons, information such as a button name 53, creator 54 can be allotted to the button like the case of "screen".

Processing contents 55 for specifying the process to which the fetched image is subjected can be allotted to the operation buttons. As the processing contents of the fetched image, for example, a process "output by printer" or "transmission with image attached to electronic mail" can be set in addition to a process "storage into file server" shown in the drawing.

A process parameter 56 is used for recording parameters relating to the process allotted to the operation button and, for example, information of a file form at the time of storage of a file, the presence or absence of enlargement/reduction at the time of printer output, or transmission destination of the electronic mail can be recorded according to the process set on the button.

The setting contents of reading for the scanner section 11 when image fetching process is effected by use of the operation button are recorded in a fetch parameter 57.

In order to prevent the operation button from being erroneously used by a different user, a password number 58 can be set to the operation button like the case of "screen".

In this example, in order to simplify the explanation, the explanation is made only for a case wherein the operation button is constructed by two hierarchies of "screen" → operation button, but even if the classification of multi-hierarchies in which "screens" are disposed below the "screen" or the classification of the operation button by the "screen" is not utilized, this invention can be applied.

In a case where the process for storage into the file server 16 is allotted to the operation button, the image processing section effects the process for recording an image fetched into the previously set file server 16 as a file.

At this time, the image is stored by use of a method which permits the construction of the button and "screen" and information such as the access limit to be used also on the file server.

The file server 16 is connected to the PC 2 (client) via the network 1 and the user accesses an image fetched from the PC 2 (client).

The user management server 17 is a server which is managed in the user environment to authorize the user by use of a user name and password and used for authorization of the user in a case where the access control of the operation button and "screen" which is explained in a second embodiment is effected for each user.

The PC 2 (client) has an access mediator 18 and image scanning/fetching application 19. The access mediator 18 which will be explained in a third embodiment processes hardware control information by which the normal image scanning/fetching application 19 operates the scanner hardware instead of the scanner hardware to convert access of the image scanning/fetching application 19 to the scanner hardware to access to the file server 16.

First Embodiment

Figure 6:
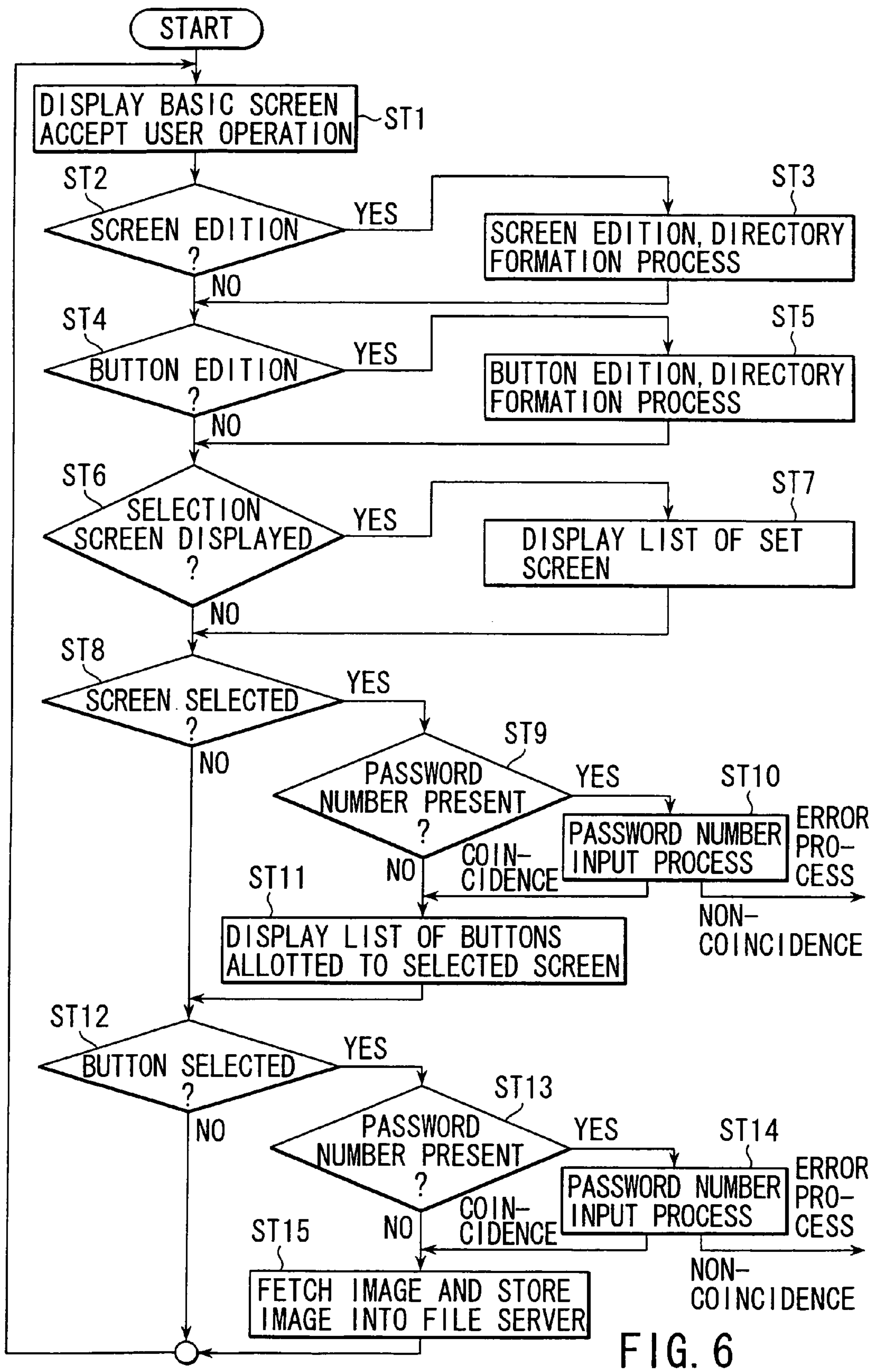
FIG. 6 is a flowchart for illustrating the process in the first embodiment.

First, the first embodiment is explained with reference to the flowchart of FIG. 6.

Figures 7, 8, 9:
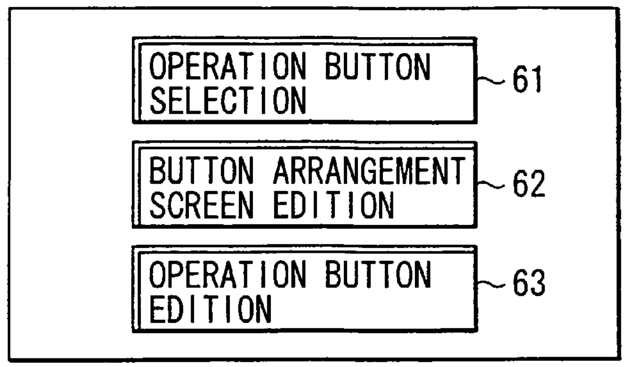
FIGS. 7 to 13 are views showing examples of display of an image display device.

When the digital copying machine 3 is activated, the image processing section 14 displays a basic screen on a screen display device 12*a* and waits for an input by the user (ST1). An example of the basic screen is shown in FIG. 7. A button 61 is an operation button selecting button for displaying a screen used for selecting buttons and "screens" set in the digital copying machine 3, a button 62 is a button arrangement screen editing button for displaying a screen used for selecting edition of the screen, and a button 63 is an operation button editing button for displaying a screen used for selecting edition of the operation button.

If the user selects edition of the screen by use of the button arrangement screen editing button 62 on the basic screen of FIG. 7 (ST2), the image processing section 14 causes the screen display device 12*a* to display a "screen" editing screen shown in FIG. 8. The user sets four items 64 to 67 by use of an input device 12*b*. For example, the user sets "10", "business department image fetching", "Takahashi", "** (password)". On the "screen" editing screen, a setting button 68 operated at the time of setting and a cancel button 69** operated at the time of canceling are provided.

The set contents of a screen input by the user are recorded on a screen setting table 40 by the image processing section 14, and at the same time, a screen directory having a screen name set by the user as a directory name is formed under a specified route directory 16*a* specified on the file server 16 (ST3).

The screen directory is set to a state "anybody can access the files and sub-directories existing in the directory, but no body is permitted to refer to the list of files and sub-directories existing in the directory" by use of an access control mechanism of the file system.

Directly under the screen directory, a sub-directory having a password number set on the screen as a directory name is formed. The sub-directory is set to a state in which anybody can access the same, but by setting a screen directory of higher position, the user cannot access the directory unless the user correctly specifies the name of the password number directory.

Further, if the user selects edition of the operation button by use of the operation button editing button 63 (ST4) on the basic screen of FIG. 7, the image processing section 14 causes the screen display device 12*a* to display the operation button editing screen shown in FIG. 9. The user sets eight items 70 to 77 by use of the input device 12*b*. For example, the user sets "8", "10", "catalogue fetching", "Takahashi", "storage into file server", "nothing", "300 dpi, bit map form", "**** (password)".

On the operation button editing screen, a setting button 78 operated at the time of setting and a canceling button 79 operated at the time of canceling are provided.

The set contents of a screen input by the user are recorded on the screen setting table 40 by the image processing section 14, and at the same time, a screen directory having a screen name set by the user as a directory name is formed under a specified route directory 16*a* specified on the file server 16 (ST5).

On the file server 16, an operation button directory having a button name allotted to the operation button as a directory name is formed directly under the password number directory which lies under the screen directory corresponding to the "screen" to which the operation button is allotted. Like the screen directory, the operation button directory is set to a state "anybody can access the files and directories existing in the directory, but no body is permitted to refer to the list thereof".

Directly under the operation button directory, a password number directory having a password number set on the operation button as a directory name is formed. The password number directory is set to a state in which anybody can access the same, but by setting a directory of higher position, the user cannot access the directory unless the user correctly specifies the directory name.

Figure 10:
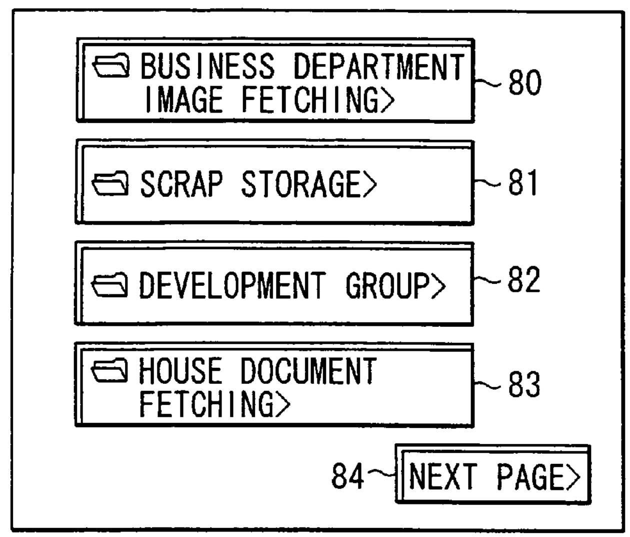

Further, if the operation button selecting button 61 is selected (ST6) on the basic screen of FIG. 7, the image processing section 14 causes the screen display device 12*a* to display a screen of FIG. 10 which displays the list of "screens" set in the digital copying machine 3 (ST7). For example, screen buttons 80 to 83 of "business department image fetching", "scrap storage", "development group", "house document fetching" are displayed.

The screen buttons 80 to 83 display the screen directories existing on the specified route directory 16*a* on the file server 16 in the form of button. If the number of screen directories is large and they cannot be displayed on one screen, a next-page button 84 is selected to display a set of next screen directories.

Figure 11:
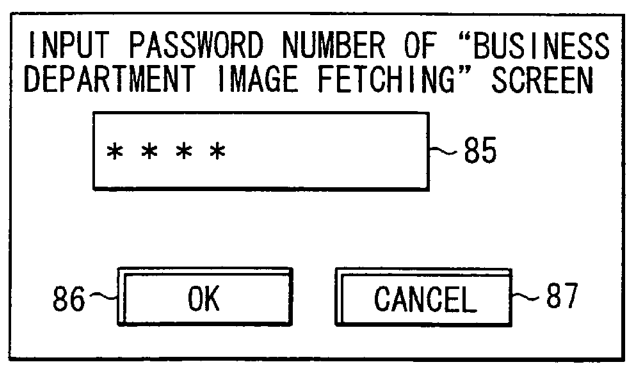

On the screen of FIG. 10, if any one of the screen buttons is selected (ST8), the image processing section 14 checks whether the password number of an object screen is present or not by use of the screen setting table 40 (ST9), and if the password number exists, it causes the screen display device 12*a* to display an input screen of the password number of FIG. 11. After watching the display, the user inputs the password number by use of the input device 12*b*. After inputting the password number, the image processing section 14 checks whether or not the password number input by the input device 12*b* coincides with the password number read out from the image setting table 40 corresponding to the screen (ST10), and if the password numbers do not coincide with each other, an error process is effected.

On the screen password number input screen, an OK button 86 operated at the time of inputting and a canceling button 87 operated at the time of canceling are provided.

If the password number input by the user is erroneous, the image processing section 14 cannot form a correct pass name of the directory in which the operation button directories exist and the screen of the list of the operation buttons is not displayed.

If the result of checking in the step ST10 indicates that the password numbers coincide with each other, or the result of checking in the step ST9 indicates that the password number of the object screen does not exist, it forms a pass name on the file server 16 by use of the input password number and the selected screen directory name and displays the directories under the pass name as operation buttons (ST11).

Figure 12:
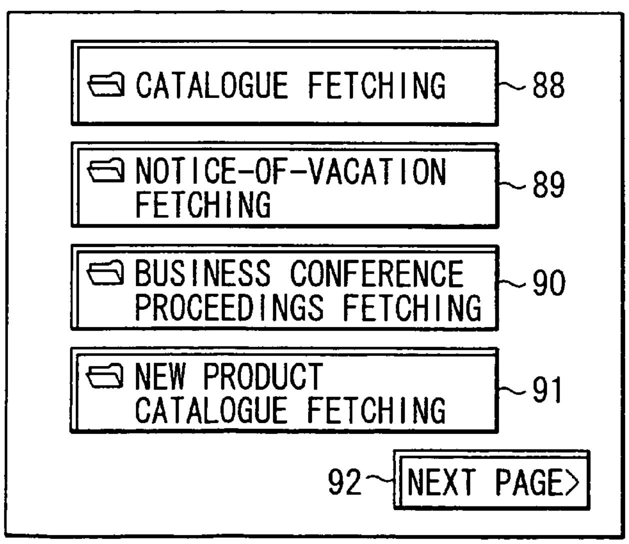

FIG. 12 shows an operation button list screen displayed on the screen display device 12*a* by the image processing section 14 if the screen button 80 for "business department image fetching" is selected, a password number is input and the password numbers coincide with each other. For example, operation buttons 88 to 91 of "catalogue fetching", "notice-of-vacation fetching", "business conference proceedings fetching", "new product catalogue fetching" are displayed.

If the number of operation buttons (directories) is large and they cannot be displayed on one screen, a next-page button 92 is selected to display a set of next operation buttons.

Figure 13:
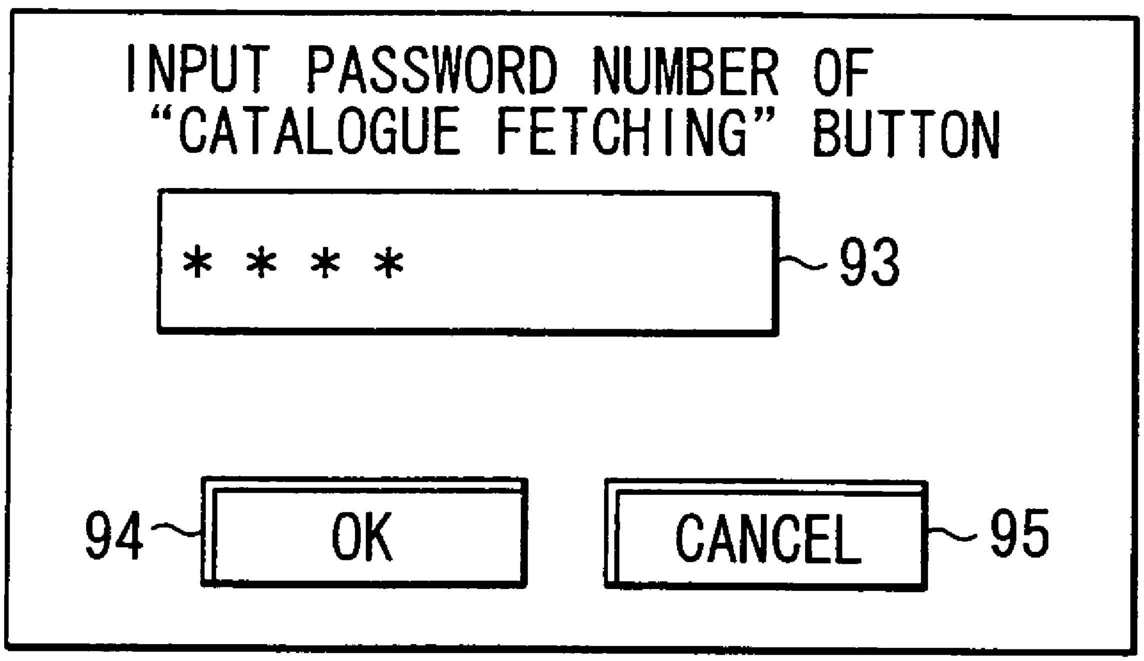

On the screen of FIG. 12, if any one of the screen buttons is selected (ST12), the image processing section 14 checks whether the password number of an object screen is present or not by use of the operation button setting table 50 (ST13), and if the password number exists, it causes the screen display device 12*a* to display an input screen of the password number of FIG. 13. After watching the display, the user inputs the password number by use of the input device 12*b*. After inputting the password number, the image processing section 14 checks whether or not the password number input by the input device 12*b* coincides with the password number read out from the image setting table 40 corresponding to the operation button (ST14), and if the password numbers do not coincide with each other, an error process is effected.

On the input screen of the operation button password number, an OK button 94 operated at the time of inputting and a canceling button 95 operated at the time of canceling are provided.

If the password number input by the user is erroneous, that is, if a correct password number is not input, the image processing section 14 cannot form a correct pass name and the screen storing process results in failure.

If the result of checking in the step ST14 indicates that the password numbers coincide with each other or the result of checking in the step ST13 indicates that the password number corresponding to the operation button does not exist, it reads an image from the scanner section 11, forms a pass name on the file server 16 by use of the screen name, screen password number, operation button name and button password number, newly forms a sub-directory under the pass name and stores the image fetched from the scanner section 11 (ST15).

Figure 14:
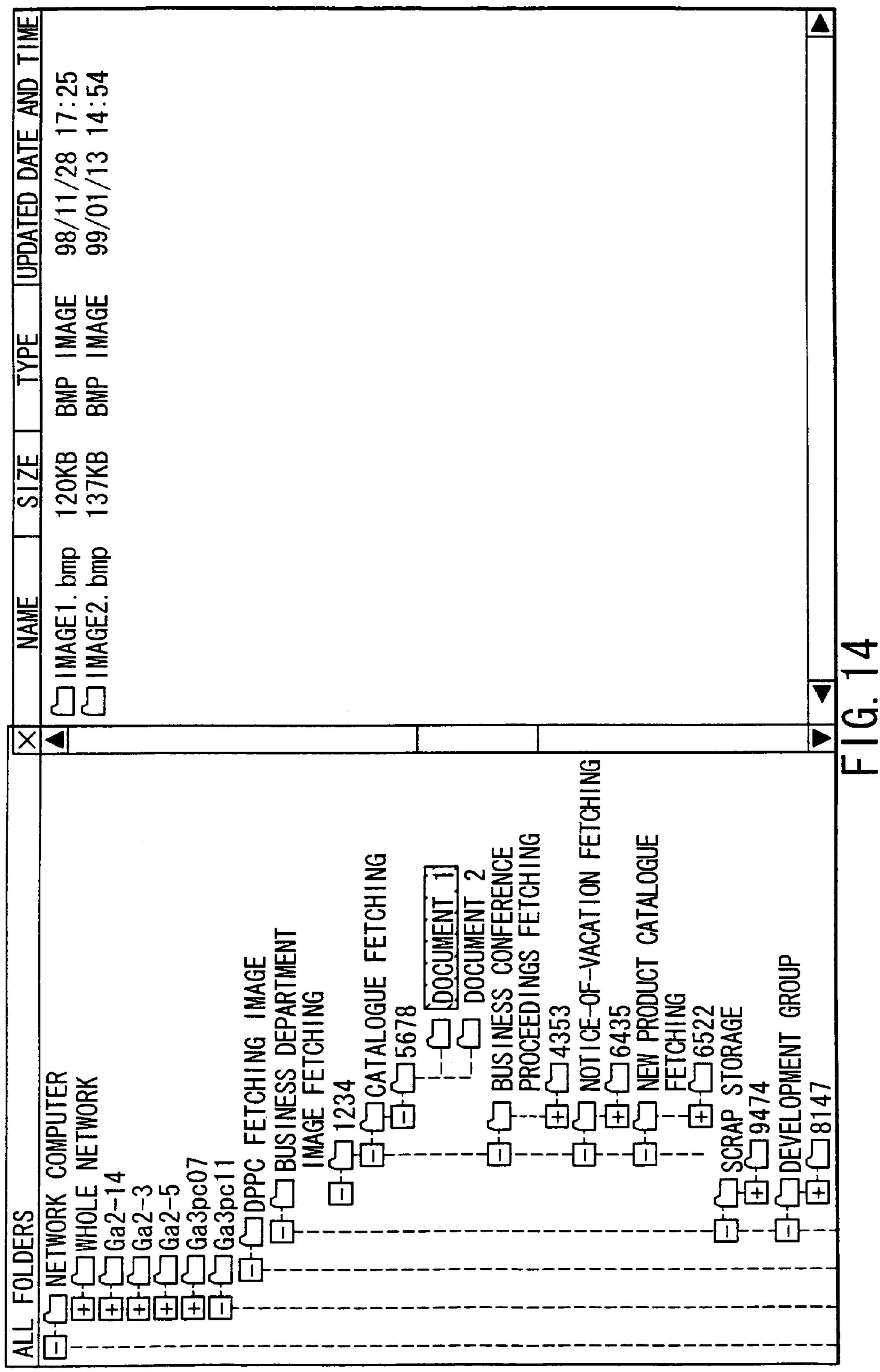
FIG. 14 is a view showing the structure of a directory of the file server.

FIG. 14 shows the structure of a directory 16*a* of the file server 16 formed as the result of the above processes. Three screen directories of "business department image fetching", "scrap storage", "development group" exist under the directory "DPC fetching image" which is a route directory and they are set in a state in which the list of the directory contents cannot be referred to. Further, the screen directory has a password number directory having a password number set on a corresponding one of the screens as a directory name as a sub-directory.

Four operation button directories "catalogue fetching", "notice-of-vacation fetching", "business conference proceedings fetching", "new product catalogue fetching" exist under the password directory "business department image fetching", and like the screen directory, they are set in a state in which the list of the directory contents cannot be referred to.

A sub-directory having the password number set on the operation button as the directory name exists under the operation button directory and two image storage directories of "document 1" and "document 2" exist under the password number directory of the button directory of "catalogue fetching". Under the image storage directory, fetched images are stored as a file.

In order to access the fetched documents, the user is required to specify a correct password number of the image, for example, "¥ business department image fetching ¥ 1234 ¥ catalogue fetching ¥ 5678" and a pass name to the image storage directory using the password number of the operation button, and therefore, the user who does not know both of the password numbers of the image and the operation button cannot access the fetched image.

A case wherein access is made to the directory of the structure shown in FIG. 14 is explained with reference to FIG. 15. In this case, the list of the image directories cannot be referred to (front half), but access can be made by specifying up to the password number directory (latter half).

As is already explained, the display contents of the image display device 12*a* of the control panel 12 of the digital copying machine (image fetching device) 3 are formed based on the directory structure on the file server 16, and therefore, if the user changes the directory structure on the file server 16 (the image name, button name, password number and the like) (by use of the PC2 or the like), the setting contents of the image display device 12*a* of the control panel 12 on the digital copying machine 3 side can also be changed without effecting an additional process.

Second Embodiment

Next, an embodiment in which a user management server 17 for managing the user is used is explained as an example in which access is more strictly limited.

FIGS. 16 and 17 show the contents of an image setting table 40' and operation button setting table 50' used in this case. In the image setting table 40' and operation button setting table 50', utilization users 45, 49 who are permitted to utilize the screen and operation button are set instead of the password numbers 44, 58 shown in FIGS. 4 and 5 (first embodiment). In the utilization users 45, 49, utilization user names are set. Passwords (user ID) set in correspondence to the respective utilization user names are set in the user management server 17 (for authorization).

Figure 18:
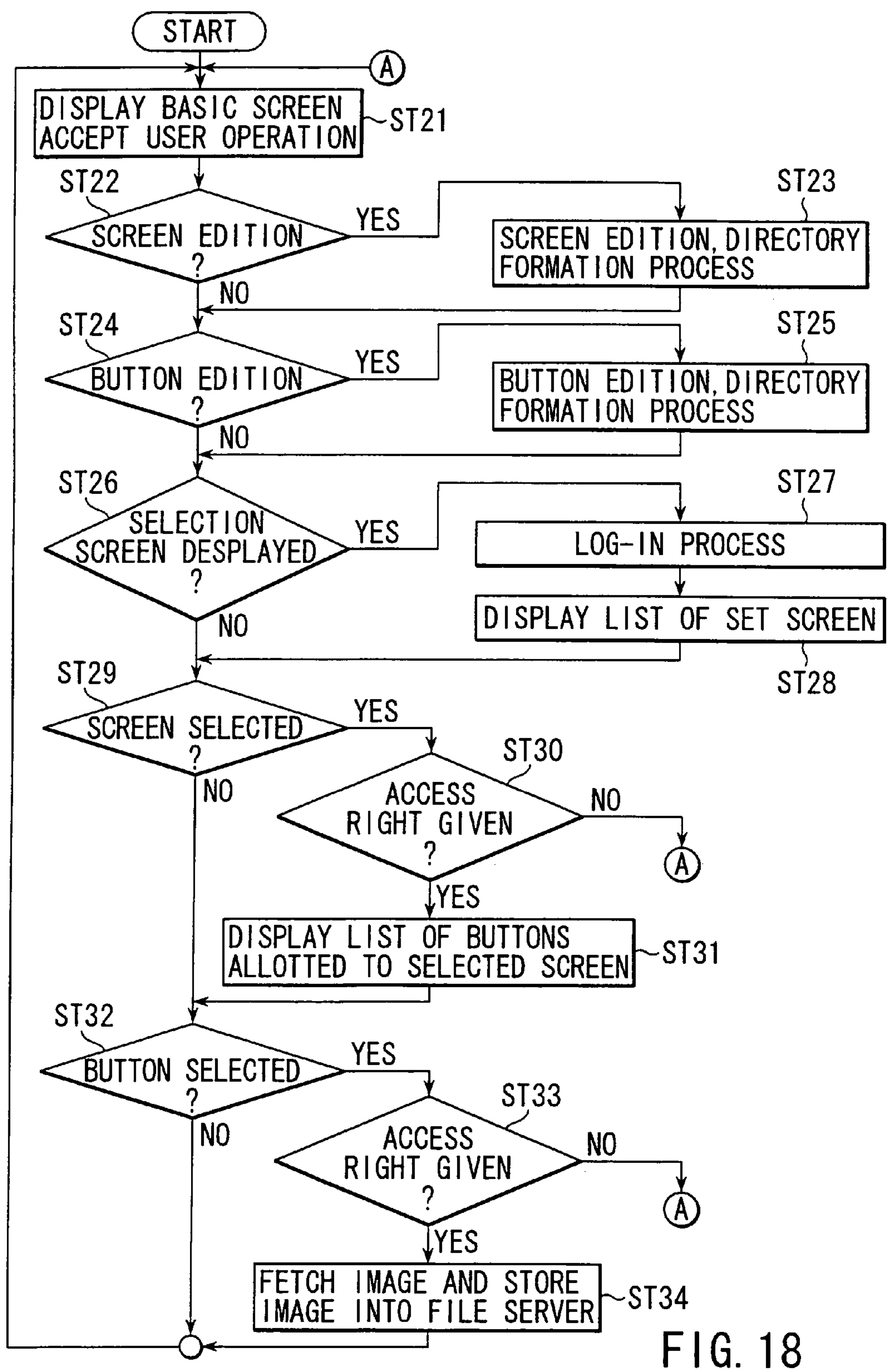
FIG. 18 is a flowchart for illustrating the process in a second embodiment.

With the above construction, the second embodiment is explained with reference to the flowchart shown in FIG. 18.

When the digital copying machine 3 is activated, the image processing section 14 displays a basic screen on the screen display device 12*a* and waits for an input by the user (ST21). An example of the basic screen is shown in FIG. 7. A button 61 is an operation button selecting button for displaying a screen used for selecting a button and "screen" set in the digital copying machine 3, a button 62 is a button arrangement screen editing button for displaying a screen used for selecting edition of the screen, and a button 63 is an operation button editing button for displaying a screen used for selecting edition of the operation button.

If the user selects edition of the screen by use of the button arrangement screen editing button 62 on the basic screen of FIG. 7 (ST22), the image processing section 14 causes the screen display device 12*a* to display a "screen" editing screen. The user sets four items by use of an input device 12*b*. For example, the user sets "10", "business department image fetching", "Takahashi", "Takahashi, Yoshida, Miki (utilization users)".

The set contents of a screen input by the user are recorded on the screen setting table 40' by the image processing section 14, and at the same time, a screen directory having a screen name set by the user as a directory name is formed under a specified route directory 16*a* specified on the file server 16 (ST23).

The screen directory is set into a state "anybody can access the files and sub-directories existing in the directory and only a specified user is permitted to refer to the list of files and sub-directories existing in the directory" by use of an access control mechanism of the file system.

Directly under the screen directory, a sub-directory having a utilization user name set on the screen as a directory name is formed. The sub-directory is set to a state in which anybody can access the same, but by setting a screen directory of higher position, the user cannot access the directory unless the user correctly specifies the name of the utilization user directory.

Further, if the user selects edition of the operation button by use of the operation button editing button 63 (ST24) on the basic screen of FIG. 7, the image processing section 14 causes the screen display device 12*a* to display the operation button editing screen shown in FIG. 19. The user sets eight items 101 to 108 shown in FIG. 19 by use of the input device 12*b*. For example, the user sets "8", "10", "catalogue fetching", "Takahashi", "storage into file server", "nothing", "300 dpi, bit map form", "Takahashi (utilization user)". On the operation button editing screen, a setting button 109 operated at the time of setting and a canceling button 110 operated at the time of canceling are provided.

The set contents of a screen input by the user are recorded on the screen setting table 40' by the image processing section 14, and at the same time, a screen directory having a screen name set by the user as a directory name is formed under a specified route directory 16*a* specified on the file server 16 (ST25).

On the file server 16, an operation button directory having a button name allotted to the operation button as a directory name is formed directly under the utilization user directory which lies under the screen directory corresponding to the "screen" to which the operation button is allotted. Like the screen directory, the operation button directory is set into a state "anybody can access the files and directories existing in the directory but only a specified user is permitted to refer to the list thereof".

Directly under the operation button directory, a utilization user directory having a utilization user name set on the operation button as a directory name is formed. The utilization user directory is set to a state in which anybody can access the same, but by setting a directory of higher position, the user cannot access the directory unless the user correctly specifies the directory name.

Further, if the operation button selecting button 61 is selected (ST26) in the basic screen of FIG. 7, the image processing section 14 causes the screen display device 12*a* to display a user log-in screen (input screen of user name and password) of FIG. 20 which is set in the digital copying machine 3. After watching the display, the user inputs the user name and password by use of the input device 12. In response to the input, the image processing section 14 checks whether or not the user name and password input by the input device 12*b* coincide with the user name read out from the image setting table 40' and associated with the screen and the password read out from the user management server 17 to determine authorization of the user (ST27). If the user is not authorized, the process returns to the step ST21.

On the user log-in screen, an OK button 113 operated at the time of inputting and a cancel button 114 operated at the time of canceling are provided.

When the log-in process (the coincidence process of the password of the user) is effected in the step ST26 and the user is authorized, the image processing section 14 causes the screen display device 12*a* to display the screen of FIG. 10 which displays the list of "screens" set in the digital copying machine 3 (ST28). For example, screen buttons 80 to 83 of "business department image fetching", "scrap storage", "development group", "house document fetching" are displayed.

The screen buttons 80 to 83 display the screen directories existing in the specified route directory 16*a* on the file server 16 in the form of button. If the number of screen directories is large and they cannot be displayed on one screen, a next-page button 84 is selected to display a set of next screen directories.

On the screen of FIG. 10, any one of the screen buttons is selected (ST29), the image processing section 14 checks whether the access right is given or not by use of the user name authorized by the log-in process and the utilization user name read out from the image setting table 40' and corresponding to the screen (ST30), and if the access right is not given, the process returns to the step ST21.

As the result of checking in the step ST30, if the access right is given, it forms a pass name on the file server 16 by use of the input utilization name user and selected screen directory name and displays directories under the pass name as operation buttons (ST31).

FIG. 12 shows an operation button list screen displayed on the image display device 12*a* by the image processing section 14 when the screen button 80 of "business department image fetching" is selected and the utilization user name is input and if it is detected that the authorization is given. For example, operation buttons 88 to 91 of "catalogue fetching", "notice-of-vacation fetching", "business conference proceedings fetching", "new product catalogue fetching" are displayed.

If the number of operation buttons (directories) is large and they cannot be displayed on one screen, a next-page button 92 is selected to display a set of next operation buttons.

On the screen of FIG. 12, if any one of the screen buttons is selected (ST32), the image processing section 14 checks whether the access right is given or not by checking whether or not the user name authorized by the log-in process coincides with the utilization user name read out from the operation button table 50' (ST33), and if the access right is not given, the process returns to the step ST21.

As the result of checking in the step ST 33, if the access right is present, an image is read from the scanner section 11 and it forms a pass name on the file server 16 by use of the image name, image utilization user name, operation button name and button utilization user name, newly forms sub-directories under the pass name and stores the image read by the scanner section 11 therein (ST34).

Figure 21:
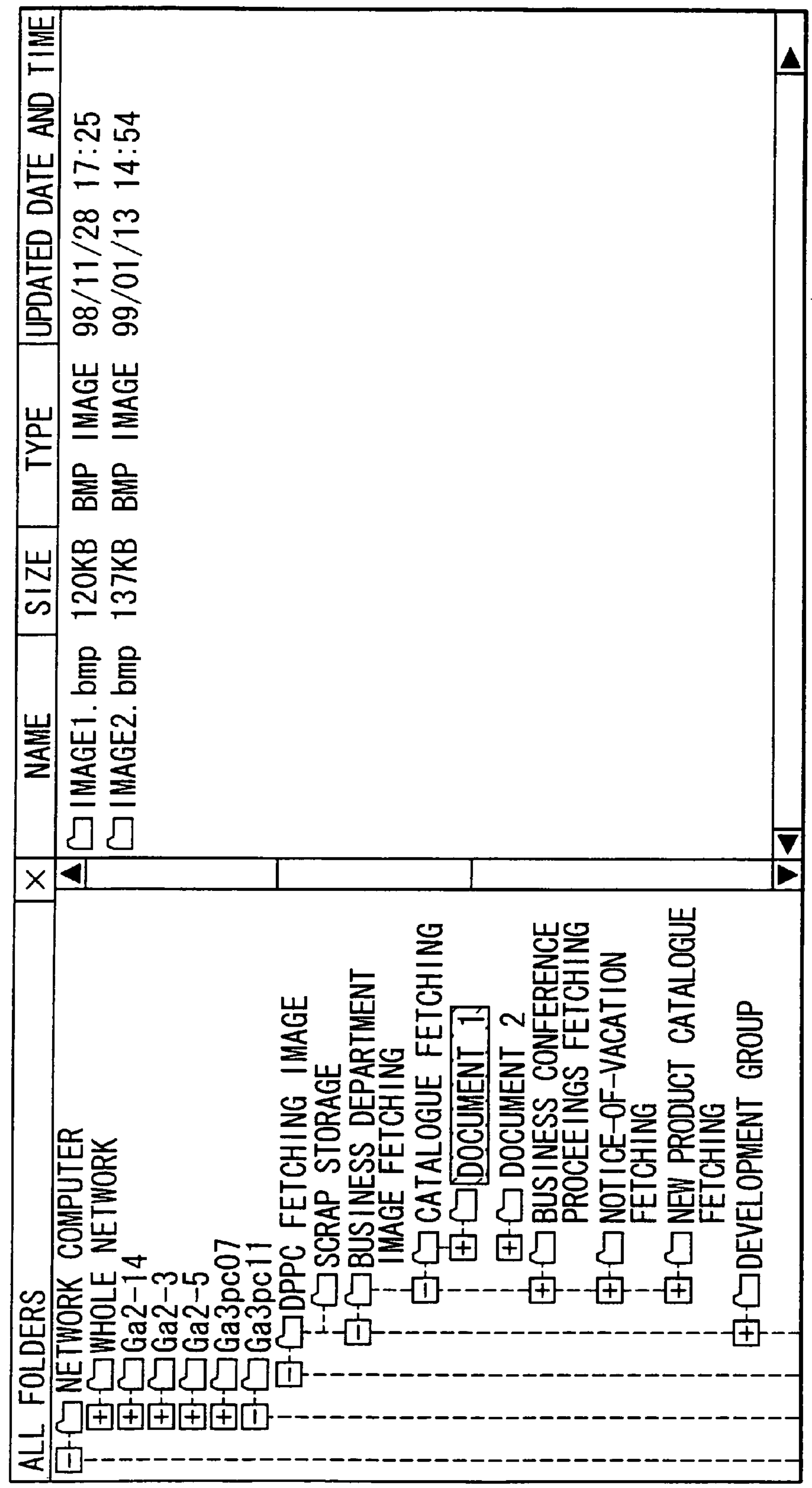
FIG. 21 is a view showing the structure of a directory of the file server.

FIG. 21 shows the structure of a directory 16*a* of the file server 16 formed as the result of the above processes. Three screen directories of "business department image fetching", "scrap storage", "development group" exist under the directory "DPC fetching image" which is a route directory and they are set in a state in which the list of the directory contents cannot be referred to. Further, the screen directory has a utilization user directory having a utilization user name set on the respective screens as a directory name as a sub-directory.

Four operation button directories "catalogue fetching", "business conference proceedings fetching", "notice-of-vacation fetching", "new product catalogue fetching" exist under the password number directory "business department image fetching", and like the screen directory, they are set in a state in which they can be accessed only by the utilizable users.

A sub-directory having the utilization user name set on the operation button as the directory name exists under the operation button directory and two image storage directories of "document 1" and "document 2" exist under the utilization user directory of the button directory of "catalogue fetching". Under the image storage directory, fetched images are stored as a file.

Thus, in the second embodiment, the password number directory is not formed under the screen directory and operation button directory. The screen directory and operation button directory are set in a state in which they can be accessed only by the utilizable users (utilization users) whose names are set to the screen/operation button by use of the access control function of the file system when they are formed.

Further, in the second embodiment, if the operation button selecting button 61 is selected in the step ST26, and after this, if the "screen" or the operation button is selected, access to the screen directory or operation directory is made based on the authorization of the user logged-in so that users who are not specified as utilization users of the screen or operation button cannot utilize the screen or operation button.

FIG. 21 shows the directory structure on the file server 17 formed according to the second embodiment. Since the screen directory "business department image fetching" is so set as to be accessed only by three persons of Takahashi, Yoshida and Miki and the operation button directory "catalogue fetching" is so set as to be accessed only by Takahashi, the "catalogue fetching" operation button can be used only by Takahashi and the images "document 1" and "document 2" fetched by use of the operation button can be accessed only by Takahashi.

As described above, in the second embodiment, the list of the operation buttons and the list of the "screens" on the screen display device 30*a* of the control panel 30 of the digital copying machine 3 are referred to by referring to the directory 16*a* on the file server 16, and therefore, if the user makes a change on the file server 16, the display contents of the screen display device 30*a* of the control panel 30 and the set contents of the access right can be changed without additionally setting contents in the copying machine 3.

Third Embodiment

FIG. 23 shows an example of a user screen when the user accesses the file server 16 recorded with the structure explained in the first embodiment by use of a device driver for access mediation and a image scanning/fetching application 19 on the PC (client) 2.

If the user fetches an image from the application, the image is displayed on the PC (client) 2 via an access mediator 18, the access mediator 18 forms a pass name on the file server 16 by use of the contents selected or input by use of a screen name 201, screen password number 202, operation button name 203, operation button password number 204, screen directory 205 on the file server 16 specified by a server name 200 and fetches the image into the application.

In the above screen, a fetch button 206 operated at the time of fetching and a cancel button 207 operated at the time of canceling are provided.

In the above embodiments, a case wherein the contents of the operation button setting table and the screen setting table are set, the directory of the filer server is set and the image is filed is explained, but this invention can also be applied to a case wherein the directory of the filer server is set after the image is filed.

If the construction inherent to the digital copying machine is not contained as the contents of the constructions of the operation button setting table and the screen setting table, it can be realized only by use of the directory of the file server without using the above tables. For example, it can be attained by removing the construction of the creator from the tables of FIGS. 4 and 5.

As described above, the hierarchy of the operation screen of the digital PPC (scanner device) used as the image fetching device is set to correspond to the hierarchy of the directory in the file server for recording a scanned image file. That is, a relation of correspondence is set up between the hierarchy of the operation screen and the hierarchy of the directory and changing points of the respective hierarchies reflect on the opposite hierarchies.

That is, in a system in which an image from a digital PPC (scanner device) used as an image fetching device is recorded by use of the file server and can be commonly used by respective PCs (client) connected thereto via a LAN, the hierarchical structure of the operation input screen of the image fetching device 3 and the hierarchical structure of the directory of the client are formed to be commonly used, and the directory structure is managed by the file server and commonly used on the image fetching device 3 side and the client side.

As a result, it becomes easier for the client side to confirm the fetched image, thereby enhancing the operability. Further, it has a simplified access control function with respect to the fetched image.

A change or addition of the button or screen of the screen display device of the control panel of the digital PPC reflects on the directory structure of the file server.

Further, a change of the directory of the storage destination reflects on the operation hierarchy of the screen of the screen display device of the control panel.

Access limit for each user previously allotted to the button, screen of the screen display device of the control panel of the digital PPC is set to correspond to access limit of the directory of the file server for storing the image.

Access control can be attained without effecting the user management by disposing a secret directory of a directory name determined based on the password number previously set on the screen or button of the screen display device of the control panel of the digital PPC between the hierarchies of the directories of the file server.

Scanner access from the scanner fetching application is converted to access to the file server in which the image is stored and access can be made to the structure formed to simulate the operation hierarchy of the screen in the screen display device of the control panel of the digital PPC from the scanner fetching application.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing system comprising:

a display which displays processing contents;

a control panel by which a password number is input by a user;

storage means for storing predetermined information items classified on a hierarchy;

a screen setting table which stores a password number being the same as a directory name of the storage means;

password number comparison means for determining whether the password number input from the control panel matches the password number stored in the screen setting table; and directory display means for displaying, on the display, a hierarchy under a directory having the same name as the password number input from the control panel, among the information items stored in the storage means, when the password number comparison means determines that the password number input from the control panel matches the password number stored in the screen setting table.

2. An image processing system according to claim 1, further comprising:

an interface which performs at least one of data input from outside and data transmission to the outside; and a scanner which read an image, wherein the image read by the scanner is stored in a predetermined directory under a corresponding password number of the storage means.

3. An image processing system according to claim 2, further comprising:

a printer section which outputs information of the image read by the scanner.

4. An image processing system according to claim 1, wherein an error message is issued when the password number comparison means determines that no password number input from the control panel matches the password number stored in the screen setting table.

5. An image processing system according to claim 1, wherein the display is formed as one unitary piece as the control panel.

* * * * *